(12) United States Patent
Li et al.

(10) Patent No.: US 12,075,461 B2
(45) Date of Patent: Aug. 27, 2024

(54) COMMUNICATION SYSTEM WITH RESOURCE SCHEDULING

(71) Applicant: Nokia Technologies Oy, Espoo (FI)

(72) Inventors: Zexian Li, Espoo (FI); Vinh Van Phan, Oulu (FI); Ling Yu, Kauniainen (FI)

(73) Assignee: Nokia Technologies Oy, Espoo (FI)

( * ) Notice: Subject to any disclaimer, the term of this patent is extended or adjusted under 35 U.S.C. 154(b) by 387 days.

(21) Appl. No.: 17/597,864

(22) PCT Filed: Jul. 30, 2019

(86) PCT No.: PCT/EP2019/070525
§ 371 (c)(1),
(2) Date: Jan. 27, 2022

(87) PCT Pub. No.: WO2021/018388
PCT Pub. Date: Feb. 4, 2021

(65) Prior Publication Data
US 2022/0256563 A1  Aug. 11, 2022

(51) Int. Cl.
*H04W 72/566* (2023.01)
*H04L 1/1812* (2023.01)
*H04L 1/1829* (2023.01)
*H04L 5/00* (2006.01)
*H04W 72/23* (2023.01)

(52) U.S. Cl.
CPC ......... *H04W 72/566* (2023.01); *H04L 1/1812* (2013.01); *H04L 1/1861* (2013.01); *H04L 5/0055* (2013.01); *H04W 72/23* (2023.01)

(58) Field of Classification Search
CPC .. H04W 72/566; H04W 72/23; H04L 1/1812; H04L 1/1861; H04L 5/0055
See application file for complete search history.

(56) References Cited

U.S. PATENT DOCUMENTS 11,539,466 B2 * 12/2022 Nammi .................. H04B 1/713
11,785,607 B2 * 10/2023 Park .................. H04W 72/0453
370/329

(Continued)

FOREIGN PATENT DOCUMENTS

| EP | 2 869 665 A1 | 5/2015 |
|---|---|---|
| WO | WO 2011/086236 A1 | 7/2011 |
| WO | WO 2018/137129 A1 | 8/2018 |

*Primary Examiner* — Chandrahas B Patel
(74) *Attorney, Agent, or Firm* — Barta Jones, PLLC (57) ABSTRACT

An apparatus in a network node has circuitry configured for causing a scheduling of an uplink transmission for a first user equipment and a downlink reception for a second user equipment on at least one resource, wherein the at least one resource is at least partially shared between the first user equipment and second user equipment. The apparatus has circuitry configured for providing an instruction, to the first user equipment, to transmit a first signal within the at least one resource. The apparatus also has circuitry configured for providing an instruction, to the second user equipment, to detect the first signal within the at least one resource. The apparatus having further circuitry configured for receiving information, from the second user equipment, wherein the information includes an indication of whether the second user equipment has detected the first signal.

20 Claims, 6 Drawing Sheets

(56) References Cited

U.S. PATENT DOCUMENTS

2018/0206176 A1 7/2018 Panteleev et al.
2020/0022138 A1* 1/2020 Cheng ................... H04W 72/21
2023/0388063 A1* 11/2023 Parkvall ................ H04L 1/1854

* cited by examiner

COMMUNICATION SYSTEM WITH RESOURCE SCHEDULING

CROSS REFERENCE TO RELATED APPLICATION

This patent application is a U.S. National Stage application of International Patent Application Number PCT/EP2019/070525 filed Jul. 30, 2019, which is hereby incorporated by reference in its entirety.

FIELD

The present application relates to a method, apparatus, and computer program.

BACKGROUND

A communication system can be seen as a facility that enables communication sessions between two or more entities such as user terminals, base stations/access points and/or other nodes by providing carriers between the various entities involved in the communications path. A communication system can be provided, for example, by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet.

SUMMARY

According to an aspect, there is provided an apparatus in a network node, comprising means for: causing a scheduling of an uplink transmission for a first user equipment and a downlink reception for a second user equipment on at least one resource, wherein the at least one resource is at least partially shared between the first user equipment and second user equipment; providing an instruction, to the first user equipment, to transmit a first signal within the at least one resource; providing an instruction, to the second user equipment, to detect said first signal within the at least one resource; and receiving information, from the second user equipment, wherein the information comprises an indication of whether the second user equipment has detected said first signal.

The means may be for determining that the uplink transmission of the first user equipment has a higher priority than the downlink reception of the second user equipment in the scheduling.

The received information may be comprised within an acknowledgment message for the scheduled downlink reception.

The means may be for receiving the information in hybrid automatic repeat request feedback.

The hybrid automatic repeat request feedback may have two codebooks, wherein one of two separate codebooks represents detecting the first signal, while the second of the two separate codebooks represents not detecting the first signal.

The means may be for receiving the information in hybrid automatic repeat request feedback, with compressed hybrid automatic repeat request acknowledgement bit information.

The means may be for determining updated resource allocation based on the received information.

The instruction to the first user equipment may be provided in an uplink resource grant message.

The instruction to the second user equipment may be provided in a downlink assignment message.

The first signal may be a pre-configured sequence.

The instructions may be provided as downlink control information with additional fields of information.

According to another aspect, there is provided an apparatus in a first user equipment, comprising means for: receiving a scheduling for an uplink transmission on at least one resource, wherein the at least one resource is at least partially shared with at least one other user equipment; receiving an instruction to transmit a first signal within the at least one resource when transmitting in uplink; and transmitting the first signal in the at least one resource.

The means for transmitting the first signal in the at least one resource may be for, transmitting the first signal in the partially shared portion of the at least one resource.

The first signal may be a pre-configured sequence.

The means may be for receiving, from a network node, an indication that uplink transmissions have a higher priority than downlink receptions.

The instruction may be provided in an uplink resource grant message.

The instruction may be provided as downlink control information with additional fields of information.

According to another aspect, there is provided an apparatus in a second user equipment, comprising means for: receiving a scheduling for an downlink reception on at least one resource, wherein the at least one resource is at least partially shared with at least one other user equipment; receiving an instruction to detect a first signal within at least one resource when receiving in downlink; detecting the first signal in the at least one resource; and transmitting information, to a network node, wherein the information comprises an indication of whether the first signal was detected.

The means for detecting the first signal in the at least one resource may be for, detecting the first signal in the partially shared portion of the at least one resource.

The means may be for receiving, from a network node, an indication that uplink transmissions have a higher priority than downlink receptions.

The means for transmitting information may be for transmitting the information in hybrid automatic repeat request feedback.

The hybrid automatic repeat request feedback may have two separate codebooks, wherein one of two separate codebooks represents detecting the first signal, while the second of the two separate codebooks represents not detecting the first signal.

The means for transmitting information may be for transmitting the information in hybrid automatic repeat request feedback, with compressed hybrid automatic repeat request acknowledgement bit information.

According to another aspect, there is provided an apparatus in a third user equipment, comprising means for: receiving a scheduling for an uplink transmission and a downlink reception on at least one resource, wherein the at least one resource is at least partially shared with at least one other user equipment; and when in an uplink mode: receiving an instruction to transmit a first signal within the at least one resource when transmitting in uplink; transmitting the first signal in the at least one resource; when in a downlink mode: receiving an instruction to detect a first signal within at least one resource when receiving in downlink; detecting the first signal in the at least one resource; and transmitting information, to a network node, wherein the information comprises an indication of whether the first signal was detected.

The means for transmitting the first signal in the at least one resource may be for, transmitting the first signal in the partially shared portion of the at least one resource.

The first signal may be a pre-configured sequence.

The means may be for receiving, from a network node, an indication that uplink transmissions have a higher priority than downlink receptions.

The instruction may be provided in an uplink resource grant message.

The instruction may be provided as downlink control information with additional fields of information.

The means for detecting the first signal in the at least one resource may be for, detecting the first signal in the partially shared portion of the at least one resource.

The means for transmitting information may be for transmitting the information in hybrid automatic repeat request feedback.

The hybrid automatic repeat request feedback may have two separate codebooks, wherein one of two separate codebooks represents detecting the first signal, while the second of the two separate codebooks represents not detecting the first signal.

The means for transmitting information may be for transmitting the information in hybrid automatic repeat request feedback, with compressed hybrid automatic repeat request acknowledgement bit information.

According to another aspect, there is provided a method performed in a network node, comprising: causing a scheduling of an uplink transmission for a first user equipment and a downlink reception for a second user equipment on at least one resource, wherein the at least one resource is at least partially shared between the first user equipment and second user equipment; providing an instruction, to the first user equipment, to transmit a first signal within the at least one resource; providing an instruction, to the second user equipment, to detect said first signal within the at least one resource; and receiving information, from the second user equipment, wherein the information comprises an indication of whether the second user equipment has detected said first signal.

The method may comprise determining that the uplink transmission of the first user equipment has a higher priority than the downlink reception of the second user equipment in the scheduling.

The received information may be comprised within an acknowledgment message for the scheduled downlink reception.

The method may comprise receiving the information in hybrid automatic repeat request feedback.

The hybrid automatic repeat request feedback may have two codebooks, wherein one of two separate codebooks represents detecting the first signal, while the second of the two separate codebooks represents not detecting the first signal.

The method may comprise receiving the information in hybrid automatic repeat request feedback, with compressed hybrid automatic repeat request acknowledgement bit information.

The method may comprise determining updated resource allocation based on the received information.

The instruction to the first user equipment may be provided in an uplink resource grant message.

The instruction to the second user equipment may be provided in a downlink assignment message.

The first signal may be a pre-configured sequence.

The instructions may be provided as downlink control information with additional fields of information.

According to another aspect, there is provided a method performed in a first user equipment, comprising: receiving a scheduling for an uplink transmission on at least one resource, wherein the at least one resource is at least partially shared with at least one other user equipment; receiving an instruction to transmit a first signal within the at least one resource when transmitting in uplink; and transmitting the first signal in the at least one resource.

The method may comprise transmitting the first signal in the partially shared portion of the at least one resource.

The first signal may be a pre-configured sequence.

The method may comprise receiving, from a network node, an indication that uplink transmissions have a higher priority than downlink receptions.

The instruction may be provided in an uplink resource grant message.

The instruction may be provided as downlink control information with additional fields of information.

According to another aspect, there is provided a method performed in a second user equipment, comprising: receiving a scheduling for an downlink reception on at least one resource, wherein the at least one resource is at least partially shared with at least one other user equipment; receiving an instruction to detect a first signal within the at least one resource when receiving in downlink; detecting the first signal in the at least one resource; and transmitting information, to a base station, wherein the information comprises an indication of whether the first signal was detected.

The method may comprise detecting the first signal in the partially shared portion of the at least one resource.

The method may comprise receiving, from a network node, an indication that uplink transmissions have a higher priority than downlink receptions.

The method may comprise transmitting the information in hybrid automatic repeat request feedback.

The hybrid automatic repeat request feedback may have two separate codebooks, wherein one of two separate codebooks represents detecting the first signal, while the second of the two separate codebooks represents not detecting the first signal.

The method may comprise transmitting the information in hybrid automatic repeat request feedback, with compressed hybrid automatic repeat request acknowledgement bit information.

According to another aspect, there is provided an method in a third user equipment, comprising: receiving a scheduling for an uplink transmission and a downlink reception on at least one resource, wherein the at least one resource is at least partially shared with at least one other user equipment; and when in an uplink mode: receiving an instruction to transmit a first signal within the at least one resource when transmitting in uplink; transmitting the first signal in the at least one resource; when in a downlink mode: receiving an instruction to detect a first signal within at least one resource when receiving in downlink; detecting the first signal in the at least one resource; and transmitting information, to a network node, wherein the information comprises an indication of whether the first signal was detected.

The method may comprise transmitting the first signal in the partially shared portion of the at least one resource.

The first signal may be a pre-configured sequence.

The method may comprise receiving, from a network node, an indication that uplink transmissions have a higher priority than downlink receptions.

The instruction may be provided in an uplink resource grant message.

The instruction may be provided as downlink control information with additional fields of information.

The method may comprise detecting the first signal in the partially shared portion of the at least one resource.

The method may comprise transmitting the information in hybrid automatic repeat request feedback.

The hybrid automatic repeat request feedback may have two separate codebooks, wherein one of two separate codebooks represents detecting the first signal, while the second of the two separate codebooks represents not detecting the first signal.

The method may comprise transmitting the information in hybrid automatic repeat request feedback, with compressed hybrid automatic repeat request acknowledgement bit information.

According to another aspect, there is provided an apparatus comprising: at least one processor; and at least one memory including computer program code, the at least one memory and the computer program code configured to, with the at least one processor, cause the apparatus at least to perform: causing a scheduling of an uplink transmission for a first user equipment and a downlink reception for a second user equipment on at least one resource, wherein the at least one resource is at least partially shared between the first user equipment and second user equipment; providing an instruction, to the first user equipment, to transmit a first signal within the at least one resource; providing an instruction, to the second user equipment, to detect said first signal within the at least one resource; and receiving information, from the second user equipment, wherein the information comprises an indication of whether the second user equipment has detected said first signal.

The at least one memory and the computer program code may be configured to, with the at least one processor, cause the apparatus at least to perform: comprise determining that the uplink transmission of the first user equipment has a higher priority than the downlink reception of the second user equipment in the scheduling.

The received information may be comprised within an acknowledgment message for the scheduled downlink reception.

The at least one memory and the computer program code may be configured to, with the at least one processor, cause the apparatus at least to perform: receiving the information in hybrid automatic repeat request feedback.

The hybrid automatic repeat request feedback may have two codebooks, wherein one of two separate codebooks represents detecting the first signal, while the second of the two separate codebooks represents not detecting the first signal.

The at least one memory and the computer program code may be configured to, with the at least one processor, cause the apparatus at least to perform: receiving the information in hybrid automatic repeat request feedback, with compressed hybrid automatic repeat request acknowledgement bit information.

The at least one memory and the computer program code may be configured to, with the at least one processor, cause the apparatus at least to perform: determining updated resource allocation based on the received information.

The instruction to the first user equipment may be provided in an uplink resource grant message.

The instruction to the second user equipment may be provided in a downlink assignment message.

The first signal may be a pre-configured sequence.

The instructions may be provided as downlink control information with additional fields of information.

According to another aspect, there is provided an apparatus comprising: at least one processor; and at least one memory including computer program code, the at least one memory and the computer program code configured to, with the at least one processor, cause the apparatus at least to perform: receiving a scheduling for an uplink transmission on at least one resource, wherein the at least one resource is at least partially shared with at least one other user equipment; receiving an instruction to transmit a first signal within the at least one resource when transmitting in uplink; and transmitting the first signal in the at least one resource.

The at least one memory and the computer program code may be configured to, with the at least one processor, cause the apparatus at least to perform: transmitting the first signal in the partially shared portion of the at least one resource.

The first signal may be a pre-configured sequence.

The at least one memory and the computer program code may be configured to, with the at least one processor, cause the apparatus at least to perform: receiving, from a network node, an indication that uplink transmissions have a higher priority than downlink receptions.

The instruction may be provided in an uplink resource grant message.

The instruction may be provided as downlink control information with additional fields of information.

According to another aspect, there is provided an apparatus comprising: at least one processor; and at least one memory including computer program code, the at least one memory and the computer program code configured to, with the at least one processor, cause the apparatus at least to perform: receiving a scheduling for an downlink reception on at least one resource, wherein the at least one resource is at least partially shared with at least one other user equipment; receiving an instruction to detect a first signal within the at least one resource when receiving in downlink; detecting the first signal in the at least one resource; and transmitting information, to a base station, wherein the information comprises an indication of whether the first signal was detected.

The at least one memory and the computer program code may be configured to, with the at least one processor, cause the apparatus at least to perform: detecting the first signal in the partially shared portion of the at least one resource.

The at least one memory and the computer program code may be configured to, with the at least one processor, cause the apparatus at least to perform: receiving, from a network node, an indication that uplink transmissions have a higher priority than downlink receptions.

The at least one memory and the computer program code may be configured to, with the at least one processor, cause the apparatus at least to perform: transmitting the information in hybrid automatic repeat request feedback.

The hybrid automatic repeat request feedback may have two separate codebooks, wherein one of two separate codebooks represents detecting the first signal, while the second of the two separate codebooks represents not detecting the first signal.

The at least one memory and the computer program code may be configured to, with the at least one processor, cause the apparatus at least to perform: transmitting the information in hybrid automatic repeat request feedback, with compressed hybrid automatic repeat request acknowledgement bit information.

According to another aspect, there is provided an apparatus comprising: at least one processor; and at least one memory including computer program code, the at least one memory and the computer program code configured to, with the at least one processor, cause the apparatus at least to perform: receiving a scheduling for an uplink transmission and a downlink reception on at least one resource, wherein the at least one resource is at least partially shared with at least one other user equipment; and when in an uplink mode: receiving an instruction to transmit a first signal within the at least one resource when transmitting in uplink; transmitting the first signal in the at least one resource; when in a downlink mode: receiving an instruction to detect a first signal within at least one resource when receiving in downlink; detecting the first signal in the at least one resource; and transmitting information, to a network node, wherein the information comprises an indication of whether the first signal was detected.

The at least one memory and the computer program code may be configured to, with the at least one processor, cause the apparatus at least to perform: transmitting the first signal in the partially shared portion of the at least one resource.

The first signal may be a pre-configured sequence.

The at least one memory and the computer program code may be configured to, with the at least one processor, cause the apparatus at least to perform: receiving, from a network node, an indication that uplink transmissions have a higher priority than downlink receptions.

The instruction may be provided in an uplink resource grant message.

The instruction may be provided as downlink control information with additional fields of information.

The at least one memory and the computer program code may be configured to, with the at least one processor, cause the apparatus at least to perform: detecting the first signal in the partially shared portion of the at least one resource.

The at least one memory and the computer program code may be configured to, with the at least one processor, cause the apparatus at least to perform: transmitting the information in hybrid automatic repeat request feedback.

The hybrid automatic repeat request feedback may have two separate codebooks, wherein one of two separate codebooks represents detecting the first signal, while the second of the two separate codebooks represents not detecting the first signal.

The at least one memory and the computer program code may be configured to, with the at least one processor, cause the apparatus at least to perform: transmitting the information in hybrid automatic repeat request feedback, with compressed hybrid automatic repeat request acknowledgement bit information.

According to another aspect, there is provided a non-transitory computer readable medium comprising program instructions thereon for performing at least the following: causing a scheduling of an uplink transmission for a first user equipment and a downlink reception for a second user equipment on at least one resource, wherein the at least one resource is at least partially shared between the first user equipment and second user equipment; providing an instruction, to the first user equipment, to transmit a first signal within the at least one resource; providing an instruction, to the second user equipment, to detect said first signal within the at least one resource; and receiving information, from the second user equipment, wherein the information comprises an indication of whether the second user equipment has detected said first signal.

According to another aspect, there is provided a non-transitory computer readable medium comprising program instructions thereon for performing at least the following: receiving a scheduling for an uplink transmission on at least one resource, wherein the at least one resource is at least partially shared with at least one other user equipment; receiving an instruction to transmit a first signal within the at least one resource when transmitting in uplink; and transmitting the first signal in the at least one resource.

According to another aspect, there is provided a non-transitory computer readable medium comprising program instructions thereon for performing at least the following: receiving a scheduling for an downlink reception on at least one resource, wherein the at least one resource is at least partially shared with at least one other user equipment; receiving an instruction to detect a first signal within at least one resource when receiving in downlink; detecting the first signal in the at least one resource; and transmitting information, to a network node, wherein the information comprises an indication of whether the first signal was detected.

According to another aspect, there is provided a non-transitory computer readable medium comprising program instructions thereon for performing at least the following: receiving a scheduling for an uplink transmission and a downlink reception on at least one resource, wherein the at least one resource is at least partially shared with at least one other user equipment; and when in an uplink mode: receiving an instruction to transmit a first signal within the at least one resource when transmitting in uplink; transmitting the first signal in the at least one resource; when in a downlink mode: receiving an instruction to detect a first signal within at least one resource when receiving in downlink; detecting the first signal in the at least one resource; and transmitting information, to a network node, wherein the information comprises an indication of whether the first signal was detected.

A computer product stored on a medium may cause an apparatus to perform the methods as described herein.

An electronic device may comprise apparatus as described herein.

In the above, various aspects have been described. It should be appreciated that further aspects may be provided by the combination of any two or more of the various aspects described above.

Various other aspects and further embodiments are also described in the following detailed description and in the attached claims.

DESCRIPTION OF FIGURES

Embodiments will now be described, by way of example only, with reference to the accompanying Figures in which.

DETAILED DESCRIPTION

Before explaining in detail some examples of the present disclosure, certain general principles of a wireless communication system and mobile communication devices are briefly explained with reference to FIGS. 1 to 3 to assist in understanding the technology underlying the described examples.

Figure 1:
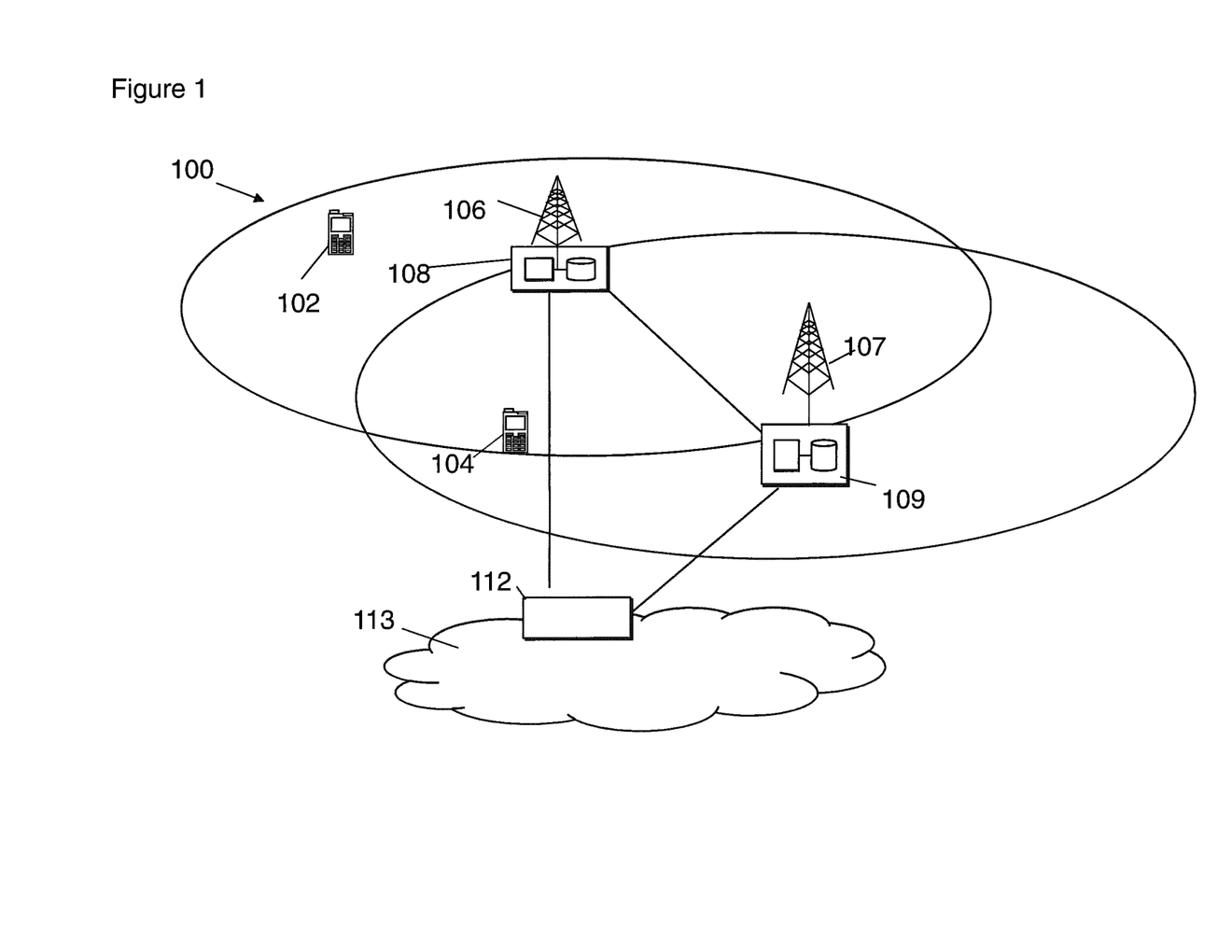
FIG. 1 shows a schematic diagram of an example communication system comprising a plurality of base stations and a plurality of communication devices.

In a wireless communication system 100, such as that shown in FIG. 1, mobile communication devices or user apparatus or user equipment (UE) 102, 104 are provided wireless access via at least one base station or similar wireless transmitting and/or receiving node or point. A user can access the communication system by means of an appropriate communication device or terminal. A communication device of a user is may be a user equipment (UE) or a machine type terminal or any other suitable device. A communication device is provided with an appropriate signal receiving and transmitting apparatus for enabling communications, for example enabling access to a communication network or communications directly with other users. The communication device may access a carrier provided by a station or access point, and transmit and/or receive communications on the carrier.

The communication system and associated devices typically operate in accordance with a given standard or specification which sets out what the various entities associated with the system are permitted to do and how that should be achieved.

A base station may be referred to more generally as simply a network apparatus or a network access point. Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatus. The controller apparatus may be part of the base station and/or provided by a separate entity such as a Radio Network Controller. In FIG. 1 control apparatus 108 and 109 are shown to control the respective macro level base stations 106 and 107. In some systems, the control apparatus may additionally or alternatively be provided in a radio network controller.

In FIG. 1, base stations 106 and 107 are shown as connected to a wider communications network 113 via a gateway 112. A further gateway function may be provided to connect to another network.

There may be smaller base stations or cells (not shown) in some networks. These may be pico or femto level base stations or the like.

Figure 2:
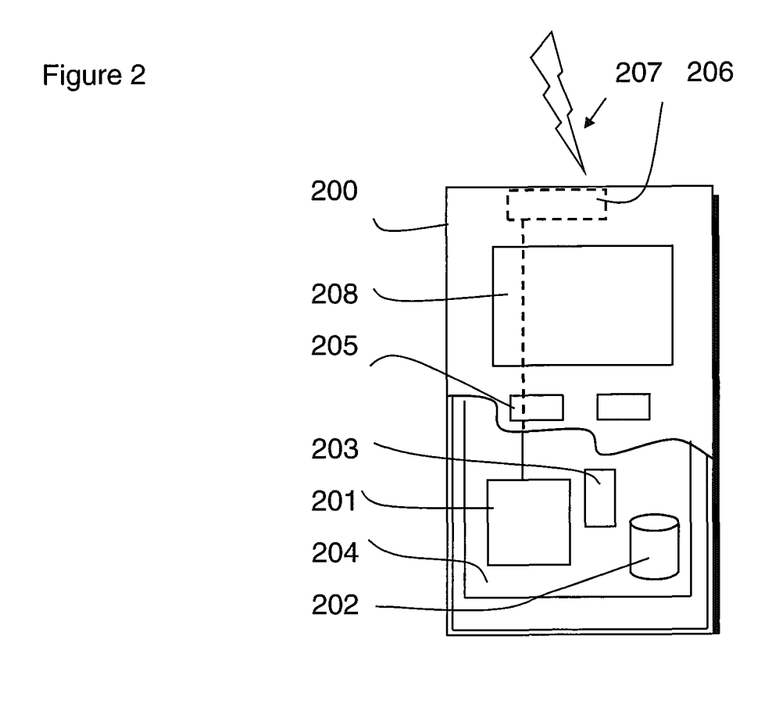
FIG. 2 shows a schematic diagram of an example communication device.

A possible communication device will now be described in more detail with reference to FIG. 2 showing a schematic, partially sectioned view of a communication device 200. Such a communication device may be a user equipment (UE) or terminal. An appropriate communication device may be provided by any device capable of sending and receiving radio signals. Non-limiting examples comprise a mobile station (MS) or mobile device such as a mobile phone or what is known as a smart phone, a computer provided with a wireless interface card or other wireless interface facility (e.g., USB dongle), personal data assistant (PDA) or a tablet provided with wireless communication capabilities, a machine type device or any combinations of these or the like.

The device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the communication device.

A device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204.

The user may control the operation of the mobile device by means of a suitable user interface such as key pad 205, voice commands, touch sensitive screen or pad, combinations thereof or the like. This may be optional in some embodiments.

A display 208, a speaker and a microphone can be also provided. One or more of these may be optional in some embodiments.

A communication device may comprise appropriate connectors (either wired or wireless) to other devices and/or for connecting external accessories, for example hands-free equipment, thereto. One or more of these may be optional.

The communication devices may access the communication system based on various access techniques.

An example of wireless communication systems are architectures standardized by the 3rd Generation Partnership Project (3GPP). A latest 3GPP based development is often referred to as 5G or New Radio (NR). The previous 3GPP based developments are often referred to as different generations for example 2G, 3G, 4G. Other examples of radio access system comprise those provided by base stations of systems that are based on technologies such as wireless local area network (WLAN) and/or WiMAX (Worldwide Interoperability for Microwave Access). It should be appreciate that although some embodiments are described in the context of a 4G and/or 5G system, other embodiments may be provided in any other suitable system including but not limited to subsequent systems or similar protocols defined outside the 3GPP forum.

Figure 3:
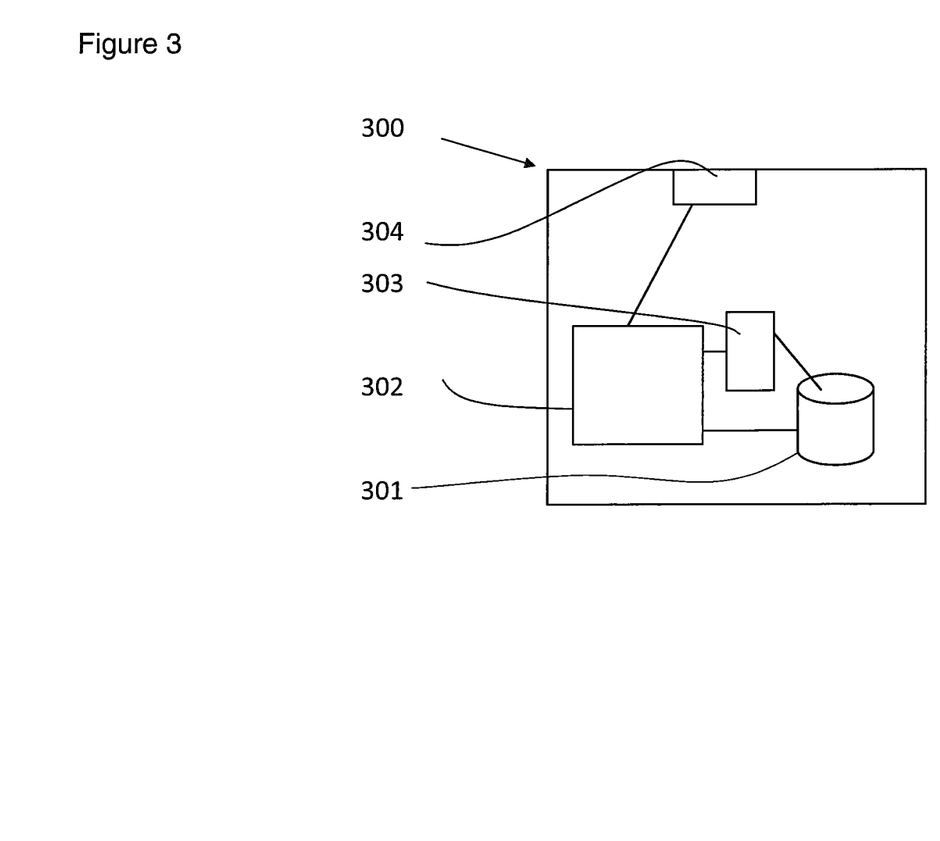
FIG. 3 shows a schematic diagram of an example network function.

An example apparatus is shown in FIG. 3. FIG. 3 shows an apparatus that could be comprised within a network function. As an example, the network function could be a base station, a management function, a serving gateway, a packet data network gateway, an access and mobility management function or a session management function. The apparatus 300 comprises at least one memory 301, at least one data processing unit 302, 303 and an input/output interface 304. For example the apparatus 300 can be configured to execute an appropriate software code to provide functions. The apparatus 300 may be included in a chipset apparatus.

Some of the example embodiments as shown below may be applicable to 3GPP 5G standards. However, some example embodiments may also be applicable to 4G, 3G and other 3GPP standards.

It has been proposed to 3GPP that flexible and/or full duplex (FD) is a potential technology and technical area for NR development. A duplex communication system is a point-to-point system of two or more connected devices that can communicate with one another in both directions. There are two types of duplex communication systems: full-duplex (FD) and half-duplex (HD). In a full-duplex system, both parties/devices can communicate with each other simultaneously. An example of a full-duplex device is a telephone; the parties at both ends of a call can speak and be heard by the other party simultaneously. In a half-duplex system, both parties/devices can communicate with each other, but not simultaneously. The communication is one direction at a time. An example of a half-duplex device is a walkie-talkie two-way radio that has a "push-to-talk" button.

Some of the following examples show communications between a base station and a plurality of user devices that the base station is serving. Duplex is referred to as a radio access technique or technology which is used for realizing UL and DL communications between the serving base station and the plurality of user devices. Traditionally FD is provided using FDD, wherein UL and DL communications are on separated non-interfering carriers and therefore can be at the same time slot. On the other hand, TDD, time-division duplexing, is thus far considered as a HD wherein UL and DL communications are on the same carrier but in separated non-overlapping time slots. However, it has been proposed to provide further enhancements to TDD to provide FD in order to reduce latency. Traditionally FD is provided using frequency division duplexing (FDD). In some examples, having FD at the network side (for example a base station) but having backward compatible half-duplex (HD) at the UE side would bring no extra complexity on UE implementation while still allowing latency reduction advantages. In examples, the base station is in control of resources used for UL transmissions and DL receptions of individual UEs being served by the base station by means of scheduling. Therefore, the base station can oversee HD operation at different UEs so that a UE may not transmit in UL and receive in DL simultaneously.

Figure 4:
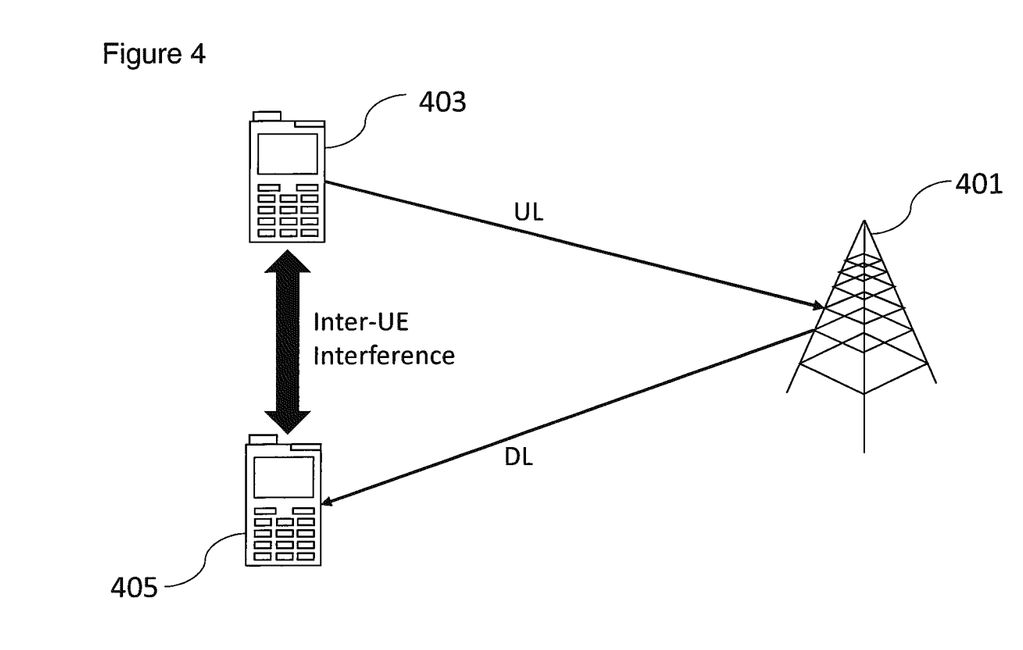
FIG. 4 shows a schematic diagram of an example communication system comprising a base station and two communication devices.

An example communication system is shown in FIG. 4. In FIG. 4, there is a base station 401. Under 5G terminology this base station 401 may be labelled as a gNB. The base station 401 may have FD capability, in that the base station 401 is capable of simultaneous transmission to user equipments and receptions from user equipments on the same carrier frequency. A first user equipment (UE) 403 is provided in FIG. 4. The first UE 403 is transmitting in the uplink to the base station 401. In other examples, the first UE 403 may be receiving in the downlink from the base station 401. A second UE 405 is provided. In FIG. 4, the second UE 405 is receiving a transmission from the base station 401 in the downlink. In other examples, the second UE 404 could be transmitting in the uplink to the base station 401. Therefore, the first UE 403 and second 405 may have both uplink and downlink capabilities. The block arrow between the first UE 403 and the second UE 405 shows the inter-UE interference that may occur between the first UE 403 and the second UE 405 depending on the network conditions. This may be due to the FD of the base station as explained in detail above.

In this example of FIG. 4, the base station 401 has full duplex capability with, for example, sufficient self-interference cancellation. Therefore, the base station 401 can receive uplink (UL) transmission from the first UE 403 and/or the second UE 405 and transmit in downlink (DL) direction towards the first UE 403 and/or the second UE 405 simultaneously. However, with full duplex capability at the base station 401 side, the frame structure, for example, DL/UL partition, for a UE can be different and can be dependent on for example, the UE traffic type or UE capability. At the UE, it can be more problematic considering DL reception due to FD operation of the base station. For example, regardless whether one UE is with or without full duplex capability, inter-UE interference may lead to performance degradation of the UE's DL reception if the FD base station schedules the overlapping resources for the DL transmission to the UE, while scheduling an UL transmission from another UE.

Referring back to FIG. 4, the base station 401 can allocate an overlapping or shared resource between the second UE 405 (for DL reception) and the first UE 403 (for UL transmission). In some examples, the resources may be partially overlapping. In a scenario when the first UE 403 and the second UE 405 are relatively far away from each other, inter-UE interference between the first UE 403 and the second UE 405 may not occur. The second UE 405 will receive DL data correctly and the base station 401 can receive data from the first UE 403 correctly. However, in a scenario wherein the first UE 403 and the second UE 405 are relatively close together, the second UE 405 may experience interference from the first UE 403. Some example embodiments, as will now be explained in more detail, can detect the presence of inter-UE interference and provide ways to report such information in order to minimize inter-UE interference.

Figure 5:
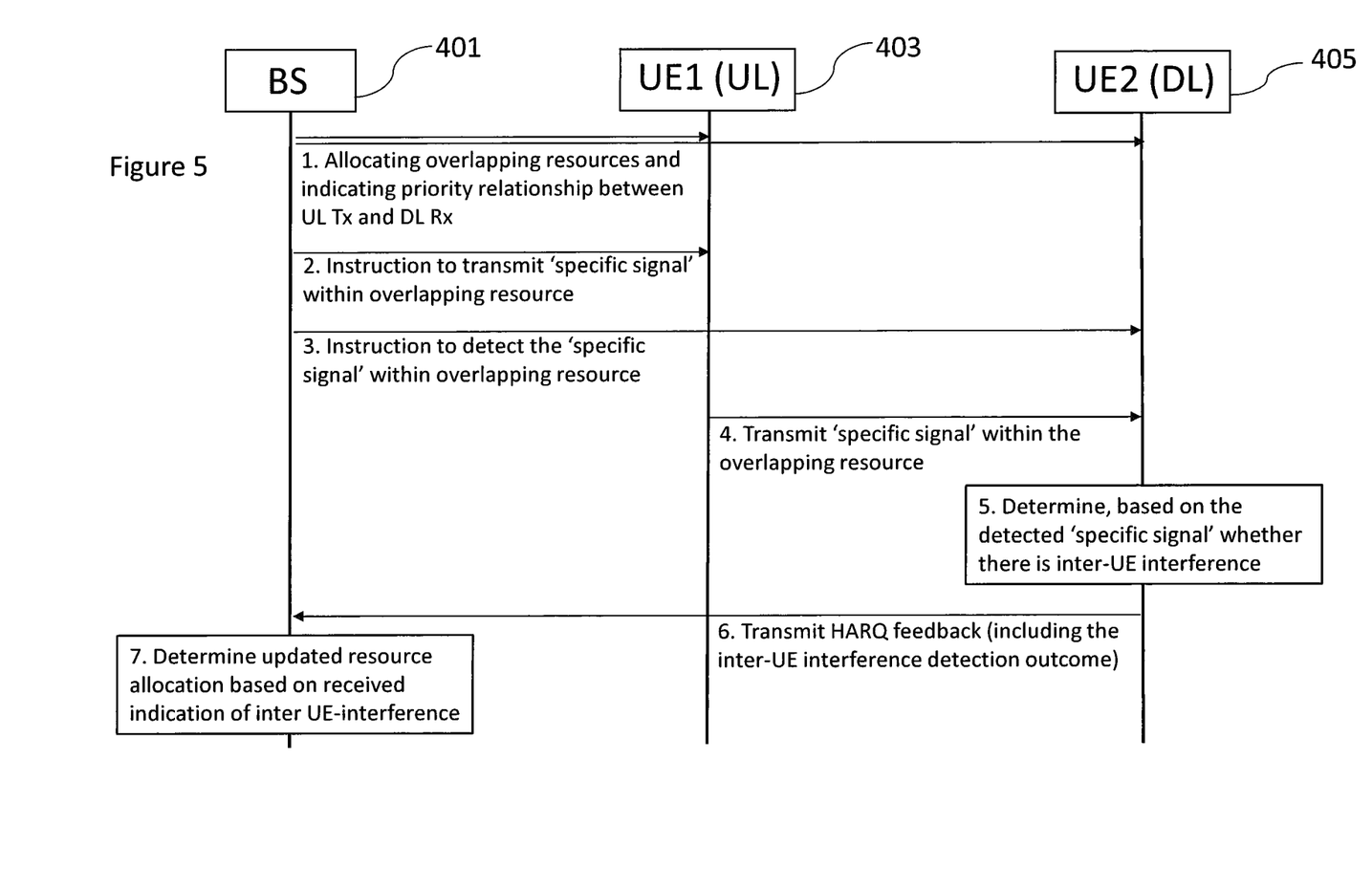
FIG. 5 shows an example signalling diagram between network entities.

FIG. 5 shows an example signalling diagram between network entities.

In step 1 of FIG. 5, the base station 401 allocates overlapping resources for the first UE 403 and the second UE 405. The overlapping resource may be a single resource, or a plurality of resources. The allocation of resources may be performed dynamically, semi-statically, or in any other suitable manner. Thus, the base station 401 will have full knowledge regarding which UEs have been allocated with overlapping resources. Therefore, the base station 401 is scheduling an uplink transmission for the first UE 403 and a DL reception for the second UE 405 on the allocated resources. The base station (network) will be aware of a priority relationship between UL transmissions and DL receptions during scheduling. During step 1, while the base station allocates overlapping resources, the base station may indicate to the first UE 403 and the second UE 405 the priority relationship between UL transmission and DL transmission. In the example as presented in FIG. 4, the UL transmission is given a higher priority compared to the DL reception. However, in other examples, the DL reception is given a higher priority compared to the UL transmission. The priority relationship can be pre-configured using, for example, radio resource control (RRC) signalling. In other examples, the priority relationship is dynamically indicated in DL control information. In an example, if the UL transmission has high priority then the first UE 403 may be instructed to send a 'specific signal' as will be discussed in more detail below. In another example, if the DL transmission has a high priority then the second UE 405 may be instructed to send a DL announcement message. The DL announcement message may be a 'specific signal' in some examples. The second UE 405 sending the DL announcement message after decoding, for example, a physical downlink control channel (PDCCH), means the first UE 403 may receive the DL announcement message and may stop UL transmission, which means giving a high priority to DL reception.

The detailed description as given below will follow the example of the UL transmission having a high priority. Thus, in this example, the following steps may be performed upon determining that the uplink transmission has a higher priority than the downlink reception in the scheduling. It is understood that the downlink reception may have a higher priority than the uplink transmission in some examples. In other examples, there may be no priority relationship between the uplink transmissions and downlink receptions but the following steps are still performed. It is also possible that UEs 403, 405 are not aware of the priority relationship between DL reception and UL transmission. In this case the first UE 403 and the second UE 405 follow the instructions from the base station 401 of whether they should send the 'specific signal' or try to detect the presence of the 'specific signal' from another UE. In step 2 of FIG. 5, the base station 401 requests the UL transmitting UE (the first UE 403) to send the 'specific signal' within the overlapping resources. The base station may instruct for the 'specific signal' to be transmitted at the beginning of the transmission. As an example, the 'specific signal' may be a pre-configured demodulation reference signal (DMRS) sequence. The request may be included in an UL resource grant message. In other examples, the request is provided in other suitable messages.

In step 3 of FIG. 5, the base station 401 requests the DL receiving UE (the second UE 405) to detect the 'specific signal' within the overlapping resource. The request may be included in a DL assignment message. In other examples, the request may be included in another suitable message.

In step 4 of FIG. 5, the first UE 403 transmits the 'specific signal' within the overlapping resource according to the request from the base station 401.

In step 5 of FIG. 5, the second UE 405 attempts to detect the 'specific signal' in the overlapping resource. If the 'specific signal' is detected by the second UE 405, for example, a correlation value is above a pre-defined threshold, then it means that there may be inter-UE interference from the first UE 403. In another example, depending on the resource used by the 'specific signal' and whether or not there is another overlapping DL transmission, then the second UE 405 may use a receive power based detection method for the 'specific signal'. In other examples, the second UE 405 uses another suitable method for determining whether there is inter-UE interference based on the detected 'specific signal'.

In step 6, the second UE 405 reports back to the base station 401 as to whether there is inter-UE interference detected or not. The reporting may be in the form of an acknowledgment message from the second UE 405 for the scheduled downlink reception. In one example option of how to report to the base station, two separate hybrid automatic repeat request (HARQ) codebooks can be specified. The network may specify the two separate HARQ codebooks and provide this information to UEs. In other examples, UEs may be pre-configured with this information. For example, one HARQ codebook can correspond to the case of no inter-UE interference being detected and the other HARQ codebook can correspond to the case where inter-UE interference is detected. Therefore, the presence of inter-UE interferer is carried within the codebook information. This example is shown in Table 1 below.

TABLE 1

HARQ codebook transmission

| | |
|---|---|
| No 'specific signal' detected | If data packet is successfully decoded -> HARQ Codebook 1 with ACK sent to base station |
| | If data packet is not successfully decoded -> HARQ Codebook 1 with NACK sent to base station |
| 'Specific signal' is detected | If data packet is successfully decoded -> HARQ Codebook 2 with ACK sent to base station |
| | If data packet is not successfully decoded -> HARQ Codebook 2 with NACK sent to base station |

The names and values given in Table 1 are shown as examples only. Other suitable values may also be used.

As another example option of reporting to the base station 401, HARQ-ACK bit information can be compressed, for example, from 2-bits to 1-bit. The additional bit can then be used to indicate the presence of inter-UE interference. Therefore, in a scenario wherein detecting the 'specific signal' is not instructed, 2-bit HARQ-ACK feedback can be operated. While in a scenario wherein detecting the 'specific signal' is instructed, then 1-bit HARQ-ACK feedback can be used and the other bit is used to indicate the presence of inter-UE interference.

As another example option of reporting to the base station 401, whenever there is overlapping resource allocation, the base station 401 allocates additional resources for reporting the detection outcome of the 'specific signal'.

At step 7 of FIG. 5, the base station 401 receives the report, including the inter-UE interference detection outcome, from the second UE 405. Based on the detected information in the received report, the base station 401 will know whether there is inter-UE interference between the first UE 403 and the second UE 405. If no inter-UE interference is detected, then the same (overlapping) resource can be shared between the two UEs. However, if inter-UE interference is detected, the base station 401 may change the resource allocated to the two UEs 403, 405 to avoid inter-UE interference. Therefore, inter-UE interference can be reduced/avoided in future transmissions.

Even though the example signalling diagram of FIG. 5 shows two separate UEs 403, 405 receiving two separate instructions from the base station 401, in other examples the base station 401 can provide a single instruction with the combined instructions, from steps 2 and 3 of FIG. 5, for the uplink and downlink scenarios to a UE. In this example, the receiving UE would have the instructions from the base station 401 to detect inter-UE interference whether the UE is operating in uplink or downlink.

In some examples, the steps shown above may be performed in a different order. In some examples, one or more steps may be removed.

In some examples, the base station 401 has full control of resource usage for both UL and DL. The resources may be allocated in a semi-static way (to support semi-persistent scheduling and/or UL configured grant transmission). In other examples, the resources may be allocated in dynamic way.

When the base station 401 allocates the overlapping resource to two UEs 403, 405, (as shown in step 1 of FIG. 5) the base station 401 can include an additional information field in the DL assignment/grant message and/or the UL assignment/grant message. The additional information field can be carried in, for example, downlink control information (DCI) of physical downlink control channel (PDCCH). The additional information field can be used to request:

The UL transmitting UE to transmit the 'specific signal' within the overlapping resource;

The DL receiving UE to detect the presence of the 'specific signal' within the overlapping resource.

Figure 6:
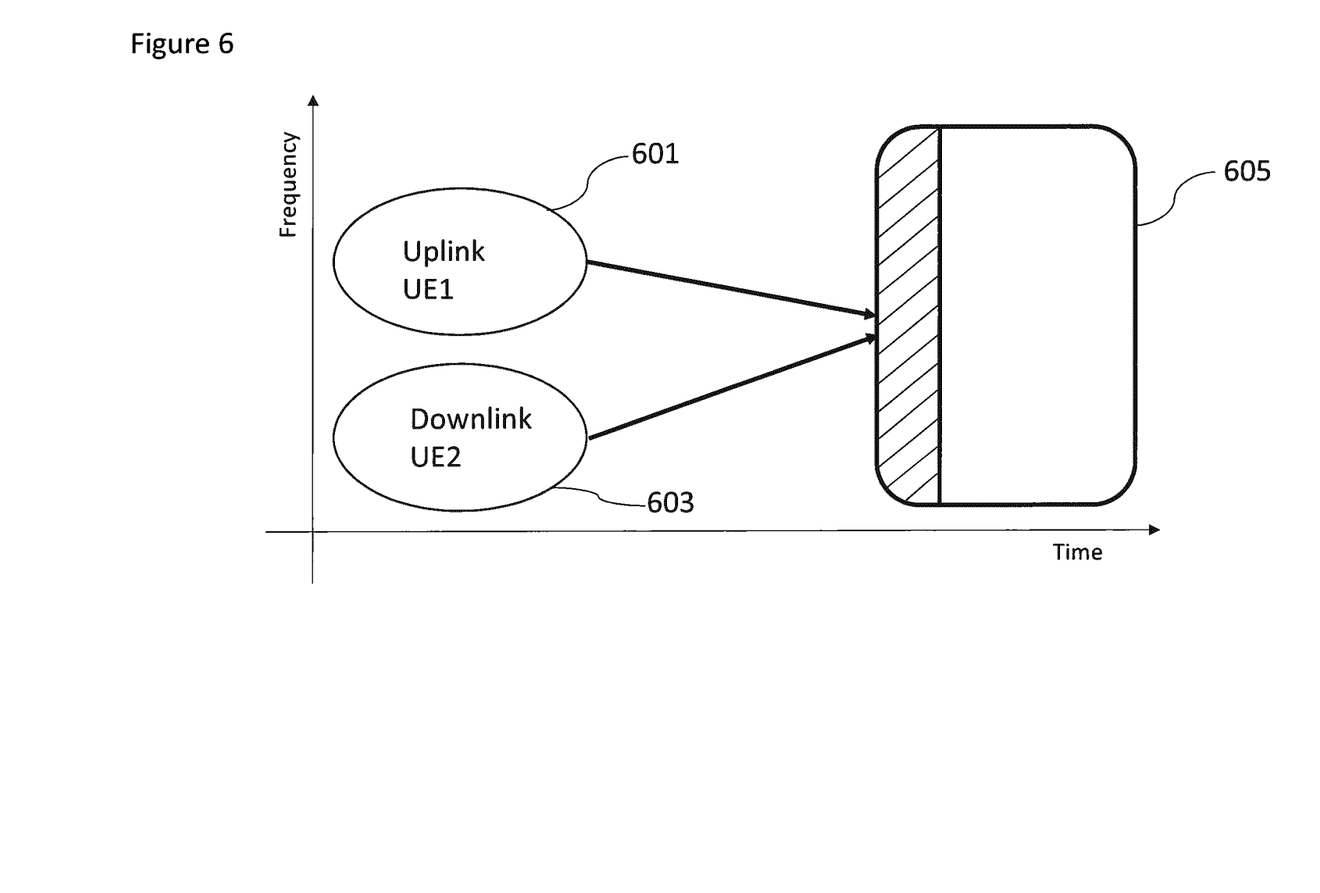
FIG. 6 shows a schematic diagram of resource block allocation.

FIG. 6 shows a schematic diagram of resource block allocation. In FIG. 6 there is provided a first DCI 601 block indicating UL resources for the first UE 403 for transmission. The first DCI 601 may include an indication of 'specific signal' transmission.

There is also provided a second DCI 603 block indicating the second UE 405 resource for DL reception. The second DCI 603 may include an indication of 'specific signal' detection.

An overlapping resource 605 is also shown in FIG. 6. The hashed part of the overlapping resource 605 shows the part of the overlapping resource that is to be used for 'specific signal' transmission and/or detection. In the example of FIG. 6, the part of the overlapping resource used for the 'specific signal' is at the beginning of the overlapping resource. In some examples, the 'specific signal' can be based on a pre-determined sequence. In some examples, the base station 401 can dynamically provide the 'specific signal' information to the UEs. The base station 401 will inform both the UL transmission UE 403 and the DL reception UE 405 about the configuration of the 'specific signal'. Once both UEs 403, 405 detect the additional information field as positive, both UEs 403, 405 will transmit/receive according to a request from base station. For the UL transmitting UE, said UE will send the 'specific signal' in the overlapping resource. Similarly, the receiving UE will attempt to detect the presence of the 'specific signal' in the overlapping resource. FIG. 6 is just given as one example where the resource for the 'specific signal' is adjacent to the resource for data transmission, while in principle the two resources are not necessarily adjacent.

Table 2 below shows an example DCI design. The example DCI design includes the additional fields that the base station 401 may provide to the UEs in order to request the UL transmitting UE to transmit the 'specific signal' within the overlapping resource and the DL receiving UE to detect the presence of the 'specific signal' within the overlapping resource. In addition, the example DCI design includes the additional fields that the base station 401 may provide to the UEs in order to request the DL receiving UE to transmit the 'DL announcement message' and the UL transmitting UE to detect the presence of the 'DL announcement message'. In a case wherein the DL announcement message is not detected, the UL transmitting UE will send the data packet with the allocated UL resource.

TABLE 2

Example of DCI design

| Fields in DCI | Value in bits |
|---|---|
| ... | ... |
| DL announcement message | 1 bit long<br>0: no<br>1: yes |
| Specific signal in UL transmission | 1 bit long<br>0: no specific signal<br>1: specific signal transmission/detection |
| ... | ... |

In an example with dynamic scheduling, the base station 401 can dynamically enable/disable the 'specific signal' transmission/detection, for example, on a per-grant basis. In an example wherein the UE is configured with a grant resource or a semi-persistent scheduling (SPS resource), enabling/disabling such features can be based on configuration via, for example, RRC signals.

Therefore, the embodiments and examples as shown above allow for a simple and effective method to detect the presence of inter-UE interference. Furthermore, allowing for an efficient method of reporting said detection to the network, thus allowing a reduction or avoidance in inter-UE interference.

It should be understood that each step in the signalling diagram of the Figures and any combination thereof may be implemented by various means or their combinations, such as hardware, software, firmware, one or more processors and/or circuitry.

It is noted that whilst embodiments have been described in relation to one example of a standalone 5G networks, similar principles maybe applied in relation to other examples of standalone 3G or LTE networks. It should be noted that other embodiments may be based on other cellular technology other than 5G or on variants of 5G. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

It should be understood that the apparatuses may comprise or be coupled to other units or modules. Although the apparatuses have been described as one entity, different modules and memory may be implemented in one or more physical or logical entities.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any steps in the signalling diagrams as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

The invention claimed is:

1. An apparatus comprising:
at least one processor; and
at least one non-transitory computer-readable medium comprising computer-executable instructions that, when execute by the at least one processor, cause the at least one processor to perform the following operations:
  allocating at least one resource as an overlapping resource for a first user equipment and a second user equipment;
  causing a scheduling of an uplink transmission for the first user equipment and a downlink reception for the second user equipment on the at least one resource, wherein the at least one resource is at least partially shared between the first user equipment and second user equipment;
  indicating to the first user equipment and the second user equipment that the uplink transmission for the first user equipment has a higher priority than the downlink reception for the second user equipment;
  based on the uplink transmission having the higher priority, providing an instruction, to the first user equipment, to transmit a specific signal within the at least one resource;
  providing an instruction, to the second user equipment, to detect the specific signal within the at least one resource;
  receiving information, from the second user equipment, wherein the information comprises a first indication that the second user equipment has detected the specific signal;
  receiving, from the second user equipment, a second indication that there is inter-user equipment interference based on the detected specific signal, wherein the second indication is an acknowledgment message from the user equipment for a scheduled downlink reception, the acknowledgment message comprising a hybrid automatic repeat request (HARQ) codebook that corresponds to the detection of the inter-user equipment interface; and
  based on the second indication, changing the allocation of the at least one resource to the first user equipment and the second user equipment to a second resource as the overlapping resource for the first user equipment and the second user equipment.

2. The apparatus as claimed in claim 1, wherein a second HARQ codebook corresponds to a case of no inter-user equipment interference.

3. The apparatus as claimed in claim 1, wherein the received information is comprised within an acknowledgment message for the scheduled downlink reception.

4. The apparatus as claimed in claim 1, where the computer-readable medium further comprises computer-executable instructions that, when executed by the at least on processor, causes the at least one processor to perform the following operation: providing the second user equipment to provide a report using the HARQ codebook or a second HARQ codebook, wherein the second HARQ codebook corresponds to a case of no inter-user equipment interference.

5. The apparatus as claimed in claim 1, where the computer-readable medium further comprises computer-executable instructions that, when executed by the at least on processor, causes the at least one processor to perform the following operation: receiving the HARQ codebook response with compressed HARQ acknowledgement bit information.

6. The apparatus as claimed in claim 1, where the computer-readable medium further comprises computer-executable instructions that, when executed by the at least on processor, causes the at least one processor to perform the following operation: determining updated resource allocation based on the second indication.

7. The apparatus as claimed in claim 1, wherein the instruction to the first user equipment is provided in an uplink resource grant message.

8. The apparatus as claimed in claim 1, wherein the instruction to the second user equipment is provided in a downlink assignment message.

9. The apparatus as claimed in claim 1, wherein the first signal is a pre-configured sequence.

10. The apparatus as claimed in claim 1, wherein the instructions are provided as downlink control information with additional fields of information.

11. A method performed in a network node, comprising:
allocating at least one resource as an overlapping resource for a first user equipment and a second user equipment;
causing a scheduling of an uplink transmission for the first user equipment and a downlink reception for the second user equipment on the at least one resource, wherein the at least one resource is at least partially shared between the first user equipment and second user equipment;

indicating to the first user equipment and the second user equipment that the uplink transmission for the first user equipment has a higher priority than the downlink reception for the second user equipment;

based on the uplink transmission having the higher priority, providing an instruction, to the first user equipment, to transmit a specific signal within the at least one resource;

providing an instruction, to the second user equipment, to detect the specific signal within the at least one resource;

receiving information, from the second user equipment, wherein the information comprises a first indication that the second user equipment has detected the specific signal;

receiving, from the second user equipment, an indication that there is inter-user equipment interference based on the detected specific signal, wherein the indication is an acknowledgment message from the user equipment for a scheduled downlink reception, the acknowledgment message comprising a hybrid automatic repeat request (HARQ) codebook that corresponds to the detection of the inter-user equipment interface; and based on the indication, changing the allocation of the at least one resource to the first user equipment and the second user equipment to a second resource as the overlapping resource for the first user equipment and the second user equipment.

12. An apparatus comprising:

at least one processor; and at least one non-transitory memory including computer program code, the at least one memory and the computer program code configured to, with the at least one processor, cause the apparatus at least to perform:

allocating at least one resource as an overlapping resource for a first user equipment and a second user equipment;

causing a scheduling of an uplink transmission for first user equipment and a downlink reception for second user equipment on the at least one resource, wherein the at least one resource is at least partially shared between the first user equipment and second user equipment;

based on the uplink transmission having higher priority than the downlink reception, providing an instruction, to the first user equipment, to transmit a specific signal within the at least one resource, wherein the specific signal signifies that the uplink transmission has the higher priority;

providing an instruction, to the second user equipment, to detect the specific signal within the at least one resource; and receiving information, from the second user equipment, wherein the information comprises a first indication that the second user equipment has detected the specific signal;

receiving, from the second user equipment, a second indication that there is inter-user equipment interference based on the detected specific signal, wherein the second indication is an acknowledgment message from the user equipment for a scheduled downlink reception, the acknowledgment message comprising a hybrid automatic repeat request (HARQ) codebook that corresponds to the detection of the inter-user equipment interface; and based on the second indication, changing the allocation of the at least one resource to the first user equipment and the second user equipment to a second resource as the overlapping resource for the first user equipment and the second user equipment.

13. The apparatus as claimed in claim 12, wherein a second HARQ codebook corresponds to a case of no inter-user equipment interference.

14. The apparatus as claimed in claim 12, wherein the received information is comprised within an acknowledgment message for the scheduled downlink reception.

15. The apparatus as claimed in claim 12, wherein the computer-readable medium further comprises computer-executable instructions that, when executed by the at least on processor, causes the at least one processor to perform the following operation: providing the second user equipment to provide a report using the HARQ codebook or a second HARQ codebook, wherein the second HARQ codebook corresponds to a case of no inter-user equipment interference.

16. The apparatus as claimed in claim 12, wherein the computer-readable medium further comprises computer-executable instructions that, when executed by the at least on processor, causes the at least one processor to perform the following operation: receiving the HARQ codebook response with compressed HARQ acknowledgement bit information.

17. The apparatus as claimed in claim 12, where the computer-readable medium further comprises computer-executable instructions that, when executed by the at least on processor, causes the at least one processor to perform the following operation: determining updated resource allocation based on the indication.

18. The apparatus as claimed in claim 12, wherein the instruction to the first user equipment is provided in an uplink resource grant message.

19. The apparatus as claimed in claim 12, wherein the instruction to the second user equipment is provided in a downlink assignment message.

20. The apparatus as claimed in claim 12, wherein the first signal is a pre-configured sequence.

* * * * *